(12) United States Patent
Klein et al.

(10) Patent No.: US 10,439,321 B2
(45) Date of Patent: *Oct. 8, 2019

(54) DEVICE FOR FASTENING AND ELECTRICAL CONTACTING OF A VEHICLE WINDOW PANE

(71) Applicant: SAINT-GOBAIN GLASS FRANCE S.A., Courbevoie (FR)

(72) Inventors: Marcel Klein, Baesweiler (DE); Dirk Doerner, Emmendingen (DE); Bernhard Reul, Herzogenrath (DE); Thorsten Kuhnen, Litzendorf (DE); Andre Carl, Ebersdorf (DE); Silvio Schatke, Bad Staffelstein (DE); Johannes Schulz, Bamberg (DE); Mathias Heppner, Burgkunstadt (DE); Olaf Kriese, Coburg (DE); Melanie Angermueller, Seidingstadt (DE)

(73) Assignee: SAINT-GOBAIN FRANCE S.A., Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,499

(22) Filed: Jan. 25, 2019

(65) Prior Publication Data
US 2019/0157801 A1 May 23, 2019

Related U.S. Application Data

(63) Continuation of application No. 15/563,541, filed as application No. PCT/EP2016/064572 on Jun. 23, 2016, now Pat. No. 10,230,195.

(30) Foreign Application Priority Data

Jul. 29, 2015 (DE) .......................... 10 2015 214 377

(51) Int. Cl.
*H01R 13/58* (2006.01)
*E05F 11/38* (2006.01)
(Continued)

(52) U.S. Cl.
CPC ........ *H01R 13/5841* (2013.01); *E05F 11/385* (2013.01); *E05F 15/689* (2015.01);
(Continued)

(58) Field of Classification Search
CPC  H01R 13/5841; H01R 13/6275; H01R 13/64; H01R 24/28; H01R 43/26;
(Continued)

(56) References Cited

U.S. PATENT DOCUMENTS 4,998,889 A * 3/1991 Moly ................... H01R 13/629
                                                                    439/247
6,315,590 B1 * 11/2001 Grois ..................... G02B 6/389
                                                                    439/248
(Continued)

FOREIGN PATENT DOCUMENTS

DE    102013003532 A1    9/2014
DE    102013003533 A1    9/2014
(Continued)

OTHER PUBLICATIONS

International Preliminary Report on Patentability for International Application No. PCT/EP2016/064572 filed Jun. 23, 2016, on behalf of Saint-Gobain Glass France, dated Jan. 30, 2018. 14 pages (German + English translation).
(Continued)

*Primary Examiner* — Travis S Chambers
(74) *Attorney, Agent, or Firm* — Steinfl + Bruno LLP

(57) ABSTRACT

A device for fastening and electrical contacting of a vehicle window pane with an integrated electrical functional element. The device includes a pane adapter fixed on the
(Continued)

Figure 1:
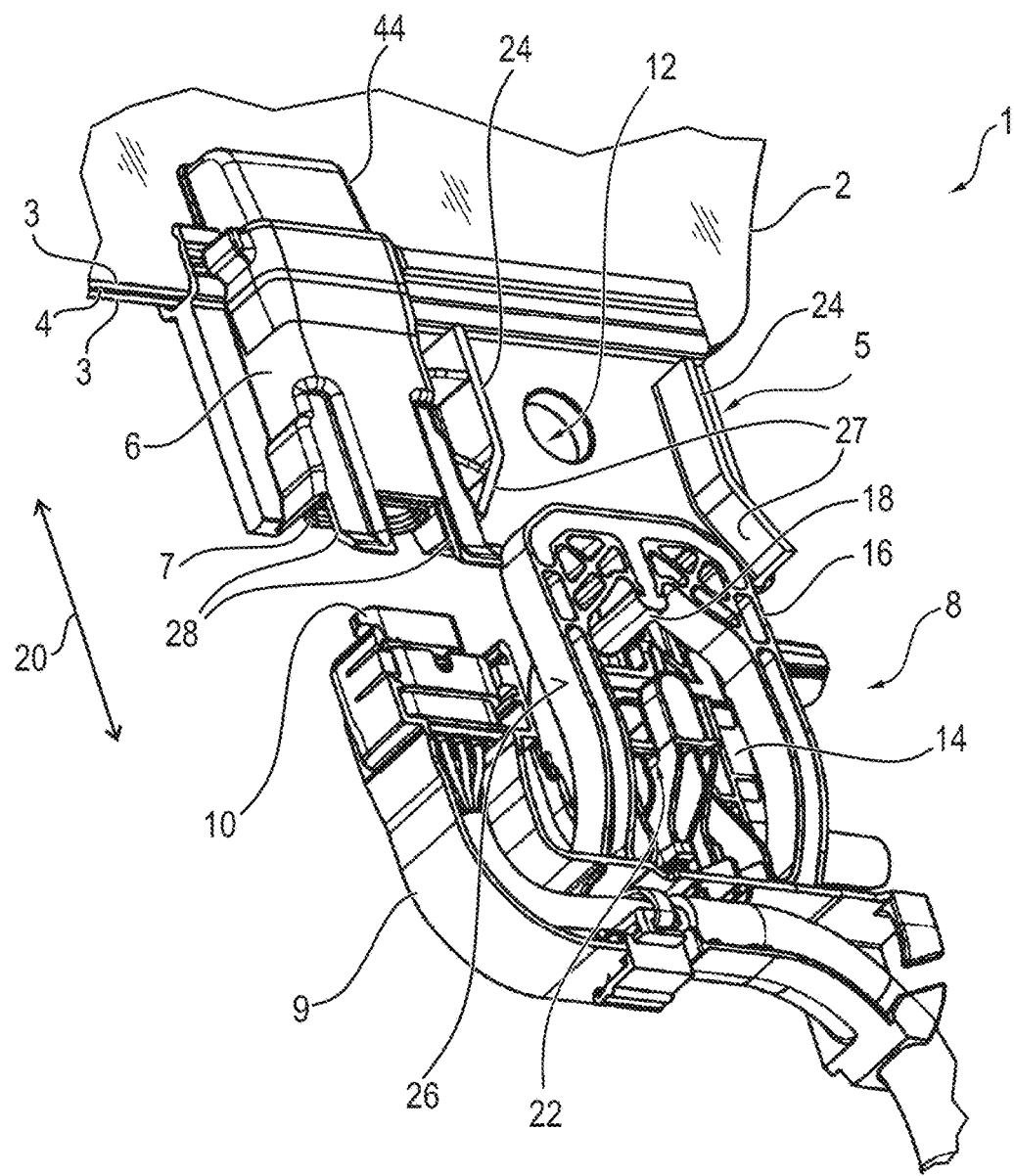

window pane; a pane holder that couples the pane adapter with a vehicle body; a pane-side plug that establishes electrical contact with the functional element when the window pane is assembled; and a pane-side coupling shoe for mounting the pane-side plug on the window pane. The device further includes a mating plug that couples with the pane-side plug to provide electrical contact of the functional element to a control unit. The pane adapter, the pane-side coupling shoe, the pane holder, and a plug holder that supports the mating plug, are kinematically coupled so that during assembly of the window pane using the pane adapter on the pane holder, the pane-side plug is connected to the mating plug.

13 Claims, 8 Drawing Sheets

(51) Int. Cl.
  *E05F 15/689* (2015.01)
  *H01R 13/627* (2006.01)
  *H01R 13/64* (2006.01)
  *H01R 24/28* (2011.01)
  *H01R 43/26* (2006.01)
  *B60J 3/04* (2006.01)
  *B60S 1/02* (2006.01)
  *H01R 13/50* (2006.01)
  *H01R 13/516* (2006.01)
  *H01R 103/00* (2006.01)

(52) U.S. Cl.
  CPC ......... *H01R 13/6275* (2013.01); *H01R 13/64* (2013.01); *H01R 24/28* (2013.01); *H01R 43/26* (2013.01); *B60J 3/04* (2013.01); *B60S 1/026* (2013.01); *E05Y 2400/654* (2013.01); *E05Y 2900/55* (2013.01); *H01R 13/50* (2013.01); *H01R 13/516* (2013.01); *H01R 2103/00* (2013.01); *H01R 2201/26* (2013.01)

(58) Field of Classification Search
  CPC .. H01R 13/50; H01R 13/516; H01R 2103/00; H01R 2201/26; H01R 12/91; H01R 13/6315; E05F 15/689; E05F 11/385; B60J 3/04; B60S 1/026; E05Y 2400/654; E05Y 2900/55

USPC .................................. 439/34, 246, 247, 370
  See application file for complete search history.

(56) References Cited

U.S. PATENT DOCUMENTS

| | | | | |
|---|---|---|---|---|
| 6,406,192 | B1* | 6/2002 | Chen | H01R 13/6315 |
| | | | | 385/56 |
| 6,638,075 | B2 | 10/2003 | Spaulding et al. | |
| 7,549,885 | B1* | 6/2009 | Oh | H01R 13/6215 |
| | | | | 439/247 |
| 8,857,883 | B2 | 10/2014 | Kargilis et al. | |
| 9,174,515 | B2 | 11/2015 | Snider | |
| 9,399,387 | B2 | 7/2016 | Kuhnen et al. | |
| 10,230,195 | B2* | 3/2019 | Klein | E05F 11/385 |
| 2010/0240229 | A1* | 9/2010 | Firman, II | H01R 13/6205 |
| | | | | 439/34 |
| 2012/0247020 | A1 | 10/2012 | Trevarrow | |
| 2013/0157491 | A1 | 6/2013 | Chavan et al. | |
| 2014/0247473 | A1 | 9/2014 | Kuhnen et al. | |
| 2018/0090876 | A1 | 3/2018 | Klein et al. | |

FOREIGN PATENT DOCUMENTS

| | | |
|---|---|---|
| DE | 102015214377 A1 | 2/2017 |
| EP | 2801689 A1 | 11/2014 |
| JP | H11067344 A | 3/1999 |
| JP | 2010007370 A | 1/2010 |
| JP | 2012510574 A | 5/2012 |
| JP | 2014186274 A | 10/2014 |
| WO | 2006/131139 A1 | 12/2006 |
| WO | 2017/016766 A1 | 2/2017 |

OTHER PUBLICATIONS

International Search Report for International Application No. PCT/EP2016/064572 filed Jun. 23, 2016, on behalf of Saint-Gobain Glass France, dated Sep. 8 , 2016. 5pages. (German + English Translation).
Non-Final Office Action for U.S. Appl. No. 15/563,541 filed Sep. 29, 2017 on behalf of Saint-Gobain Glass France, dated Apr. 4, 2018. 12 pages.
Notice of Allowance for U.S. Appl. No. 15/563,541, filed Sep. 29, 2017, on behalf of Saint-Gobain Glass France, dated Oct. 29, 2018. 9 pages.
Written Opinion for International Application No. PCT/EP2016/064572 filed Jun. 23, 2016, on behalf of Saint-Gobain Glass France, dated Sep. 8, 2016. 12 pages (German + English translation).

\* cited by examiner

DEVICE FOR FASTENING AND ELECTRICAL CONTACTING OF A VEHICLE WINDOW PANE

CROSS REFERENCE TO RELATED APPLICATIONS

The present application is a continuation of U.S. patent application Ser. No. 15/563,541 filed on Sep. 29, 2017, now U.S. Pat. No. 10,230,195 issued on Mar. 12, 2019, which is the US national stage of International Patent Application PCT/EP2016/064572 filed on Jun. 23, 2016, which in turn claims priority to German Patent Application No. 10 2015 214 377.5 filed on Jul. 29, 2015, all of which are incorporated herein by reference in their entireties.

The invention relates to a device for fastening and electrical contacting of a vehicle window pane, in which at least one electrical functional element is integrated.

In motor vehicles, in particular in automobiles, vehicle window panes (referred to in the following for short as "vehicle panes") with electrical functional elements are frequently used. Such functional elements are frequently a pane heater, as used in most motor vehicles in a rear window pane. To also be able to free front windows and, optionally, also side windows of condensed and possibly frozen moisture, pane heaters are also sometimes used in front windows and side windows in modern vehicles. Alternatively, or in addition to a pane heater, other functional elements are sometimes used in a window pane. These are, for example, so-called "electro transparent", in particular electrochromic layers, which, upon changing an electrical control voltage applied to the layer, result in a color change (darkening) or an opacification of the vehicle pane—in particular in terms of protection from the sun or undesirable looking into the vehicle.

Electrical functional elements regularly require establishing contact with an associated control unit for controlling and supplying power. Frequently, this contacting is undertaken separately after assembly of the respective vehicle pane on the vehicle body, for example, by connecting a pane-side plug to a (control-side) mating plug or pane-side connection contacts are fixedly connected (for example, by soldering) to corresponding contacts of the control unit.

The object of the invention is to simplify the assembly of a vehicle window pane with an integrated electrical functional element on a vehicle body.

This object is accomplished according to the invention by a device with the features of the claims. Further advantageous embodiments and improvements of the invention, sometimes inventive per se, are set forth in the subclaims as well as the following description.

The device according to the invention is used for fastening and electrical contacting of a vehicle window pane (in the following, for short: "vehicle pane"), in which at least one electrical functional element is integrated. The device (referred to in the following as "fastening device") includes a pane adapter that is constructed for (preferably irreversible) fixing on the vehicle pane. The fastening device further includes a pane holder that is constructed for coupling the pane adapter with a body of the vehicle (in the following: "vehicle body"). The fastening device further includes a pane-side plug (in the following, for short: "pane plug") that, in the intended assembled state, establishes electrical contact with the functional element of the vehicle pane. The fastening device further includes a pane-side coupling shoe that is constructed and provided for mounting the pane plug on the vehicle pane, and that is, in the intended assembled state, affixed directly or indirectly on the vehicle pane. Moreover, the fastening device includes a mating plug that is constructed and provided to be coupled to the pane plug for the electrical contacting of the functional element with a control unit. The fastening device further includes a plug holder for mounting the mating plug. The pane adapter and the pane-side coupling shoe as well as the pane holder and the plug holder supporting the mating plug are kinematically coupled such that, during assembly of the vehicle pane on the vehicle body, i.e., during assembly of the vehicle pane using the pane adapter on the pane holder, the pane plug is preferably connected automatically (i.e., in particular without further action) to the mating plug. Also, an elastic stop element that is constructed to apply a coupling force for the intended coupling of the pane plug with the mating plug during assembly of the vehicle pane is arranged on the pane-side coupling shoe or on the plug holder. In the intended assembled state (of the vehicle pane on the vehicle body), the pane-side plug and the mating plug are mounted (at least along an assembly direction, along which the window pane with the pane holder is to be connected) on the pane-side coupling shoe or on the plug holder with play (i.e., at least slightly displaceable along the assembly direction).

This mounting with play is, in particular, enabled by the elastic stop element. The mounting with play is thus preferably always done, in the intended assembled state, on the component (coupling shoe or plug holder), on which the elastic stop element is arranged. In other words, the pane plug is mounted (is guided) with play (displaceably, "floatingly") on the coupling shoe if the elastic stop element is arranged on the coupling shoe. Accordingly, in this case, the mating plug is preferably mounted without play on the plug holder (associated therewith), directly above the pane plug but with play on the coupling shoe. In an alternative embodiment, the mounting with play in the intended assembled state is preferably done on the plug holder, if the elastic stop element is arranged on the plug holder. Accordingly, in a last embodiment variant, the pane plug is fixed, in particular, without play, on the coupling shoe. Preferably, the pane plug is also already mounted in the assembled state not completely as intended (but, rather, in a partially assembled state) of the vehicle pane (i.e., when this is not yet installed on the vehicle body) with play on the coupling shoe (or, in an alternative embodiment, the mating plug is mounted with play on the plug holder).

Here and in the following, the terms "pane plug" and "mating plug" mean, in particular, components corresponding to one another, which, on the one hand, include necessary electrical contacts for establishing electrical contact, and also, on the other, a plug body surrounding the connector contacts, which is implemented for preferably media-tight and, in particular, captive coupling (connection) with the plug body of the corresponding other component. In principle, in the context of the invention, the captive coupling can be implemented by a friction connection between the pane plug and the mating plug (i.e., in particular, between their plug bodies), with the separating force required for separating the coupling (i.e., the frictional force present between the plug bodies) being preferably greater than forces usually acting on such plugs during the operation of a vehicle. Preferably, however, the pane plug and the mating plug have corresponding latching elements, by means of which they are, in particular, positively latched to one another, in the intended assembled state.

Due to the kinematic coupling of the pane adapter with the coupling shoe as well as that of the plug holder with the pane holder, "blind assembly" of the vehicle pane on the vehicle body is advantageously enabled. In other words, during assembly of the vehicle pane, an assembler does not have to pay attention to the fact that, in addition to the coupling of the pane adapter with the pane holder, the pane plug also couples with the mating plug, but can instead insert the pane in one process step and, in particular, in a simple manner into the vehicle body or into the pane holder—the electrical contacting of the functional element occurs automatically (by itself). Thus, an additional process step for electrical contacting is eliminated, by which means the assembly of the vehicle pane is simplified.

Because of the fact that the pane plug and the mating plug coupled therewith are mounted with play in the intended assembled state, it is also advantageously prevented that during operation of the vehicle (for example, in particular while driving on an uneven, bumpy roadway) relative movements between the vehicle pane and the pane holder, which are frequently unavoidable due to manufacturing tolerances, are not transferred to the electrical connection contacts of the mating plug or the pane plug. Instead, during such relative movements, the plugs coupled to one another (i.e., the pane plug and the mating plug) move together along the coupling shoe (or the plug holder). Thus, wear of the electrical contacts as well as an undesirable separation of the pane plug from the mating plug is advantageously avoided, and, hence, the functional reliability of the functional elements integrated in the vehicle pane is increased.

In a preferred embodiment, the elastic stop element is, in particular, arranged on the coupling shoe. In other words, in the intended assembled state, the pane plug (and the mating plug coupled thereto) is mounted with play on the coupling shoe. The coupling shoe is preferably implemented as a type of "guide sleeve", which is oriented along the assembly direction and in which the pane plug (preferably even in the partially assembled state) is displaceably arranged along the assembly direction. The elastic stop element forms a stop limiting the displacement path of the pane plug in the direction toward the vehicle pane, against which the pane plug runs during coupling with the mating plug. In other words, the pane plug is displaced against this stop by the mating plug during assembly. Thus, the coupling force required for coupling the pane plug with the mating plug is built up.

In an expedient embodiment, the elastic stop element is implemented such that the coupling force that is required for the intended coupling of the pane plug with the mating plug is less than an assembly force required to achieve the intended assembled state of the vehicle pane on the vehicle body. In other words the elastic stop is, in particular, implemented such that during assembly of the vehicle pane, initially, the coupling force for the intended coupling of the pane plug with the mating plug must be expended against the elastic stop element and, following that—to form the intended assembled state of vehicle pane—an assembly force exceeding the coupling force must be overcome. This assembly force likewise results, for example, from resistance of the elastic stop element against deformation. Thus, it is advantageously accomplished that the pane plug and the mating plug are coupled as intended before the vehicle pane is installed as intended on the vehicle body. Thus, it is possible, in a simple manner, to avoid the pane plug being only inadequately coupled to the mating plug in the intended assembled state of the vehicle pane.

In a particularly expedient embodiment, the pane adapter and the pane holder are designed such that when the required assembly force is reached, latching (i.e., positive coupling) between the pane adapter and the pane holder is implemented. To that end, the pane adapter and the pane holder preferably have corresponding latching elements, which latch positively with one another when the assembly force is reached. For example, the assembly force required for latching results in this case from a structural design of the latching elements, i.e., from a resistance of the latching elements against movement. Alternatively, the assembly force is based on the resistance of the elastic stop element, but preferably on a combination of the resistance of the latching elements and of the elastic stop element.

In order to enable simple monitoring of the intended assembled state during assembly of the vehicle pane on the vehicle body, the elastic stop element is, in an advantageous embodiment, constructed and provided, to emit acoustic and/or haptic feedback (in particular, to the assembler of the vehicle pane) for signaling the intended assembled state of the vehicle pane on the vehicle body. Acoustic feedback is preferably a cracking or clicking sound. Haptic feedback is, for example, a load peak occurring when the required assembly force is reached with a subsequent significant decrease of the opposing force occurring during assembly.

In a preferred embodiment, the elastic stop element is implemented such that, in the intended assembled state of the vehicle pane on the vehicle body, the mounting with play of the pane plug as well as the mating plug (in particular on the coupling shoe) is free of force along the assembly direction of the vehicle pane at least in a region of approx. 1 to 3 mm (i.e., down to negligible, friction-based force components). In other words, the elastic stop element frees the pane plug and the mating plug coupled therewith in the intended assembly position in (is thus "decoupled" therefrom) such that the mating plug and the pane plug in the intended assembled state can move both in the direction of the vehicle pane and away from it, in particular with play of approx. 1 mm to 3 mm. Thus, in the event of relative movements between the vehicle pane and the pane holder, which frequently run in the intended assembled state, in particular, in a design related fashion along the assembly direction of the vehicle pane, no force is exerted on the connection between the pane plug and the mating plug.

In an embodiment conceivable, in principle, in the context of the invention, the elastic stop element is at least one pin-like projection that is preferably connected in one piece (using injection molding technology) to the coupling shoe (or, optionally, to the plug holder) and is structurally designed such that, when the required assembly force is reached, it breaks off from the coupling shoe (or the plug holder) and thus enables movement of the pane plug (as well as of the mating plug coupled thereto) beyond the stop originally formed by the projection.

In a particularly preferred embodiment, the elastic stop element is, however, a spring. The use of the spring advantageously enables repeated application of the coupling force as well as, optionally, the assembly force, in particular if the vehicle pane must be replaced, for example, because of damage.

In another preferred embodiment, which is, in particular, advantageous if, in the intended assembled state, the pane plug and the mating plug coupled therewith are mounted free of force in the coupling shoe (or, optionally, on the plug holder), the spring is, in particular, bistable. Here, "bistable" means that the spring has two stable states, in which it assumes, in each case, different positions along the assembly direction. The spring is, in particular, implemented roughly like a "clicking frog". In its first state, the spring is preferably arranged on the coupling shoe (or, optionally, on the plug holder) such that it forms the aforedescribed stop for coupling the pane plug with the mating plug. In this first spring position, during assembly of the vehicle pane, the pane plug (or, optionally, the mating plug) runs against the spring such that the coupling force is formed. Consequently, this first spring position is also referred to as the "stop position". When the assembly force (which is transferred from the pane plug coupled with the mating plug to the spring) is reached, the spring changes suddenly to its second state and, thus, to a second spring position (also referred to as the "release position"). In this release position, the spring is, in particular, decoupled from the pane plug and the mating plug coupled therewith such that the two plugs are mounted with play. When the spring is arranged on the coupling shoe, it is expediently arranged in the release position with less distance from the vehicle pane than in the stop position.

Expediently, the spring is implemented, in particular, as a hoop-like or yoke-like curved (arched) spring strip, that is arched toward the pane plug or the mating plug in the stop position and is arched away from them in the release position. At the time of the sudden change from the first state into the second state, the spring also preferably emits a clicking sound like a clicking frog as acoustic feedback.

In an expedient embodiment, the pane adapter is integrally connected to the pane-side coupling shoe, and the pane holder is integrally connected to the plug holder for the mating plug. In particular, these are in each case plastic components produced with injection molding technology. Thus, further assembly effort can be saved since in each case only one component has to be fastened on the vehicle pane or on the vehicle body.

In an alternative embodiment conceivable in the context of the invention, the pane adapter and the coupling shoe as well as the pane holder and the plug holder are implemented as components separate from one another and (kinematically) coupled to one another in each case during assembly using the vehicle pane or adjacent body components.

In another alternative embodiment, the pane adapter and the coupling shoe as well as the pane holder and the plug holder are likewise each implemented separately. However, in this case, the pane adapter preferably has connecting means for connecting to the coupling shoe and, correspondingly, the pane holder has connecting means for connecting to the plug holder such that for vehicle panes without an electrical functional element, only the pane adapter and the pane holder can be used. For vehicle panes with an electrical functional element, the pane adapter and the pane holder are in each case expediently augmented by the coupling shoe (with the pane plug mounted therein) or the plug holder (with the mating plug mounted thereon).

In another expedient embodiment, the pane plug in the intended assembled state (and preferably also in the intended "pre-assembly state", i.e., when only the pane plug is installed on the vehicle pane) is electrically contacted with the functional element of the vehicle pane such that relative movement between the pane plug and the vehicle pane is possible. This is, in particular, advantageous when the pane plug is mounted with play in the (pane-side) coupling shoe. The contacting of the pane plug with the functional element is advantageously designed such that, with relative movements between the pane plug and the vehicle pane, a force effect on the contact points between the pane plug and the functional element or wear of these contact points is avoided or suppressed. Preferably, for this, the functional element of the vehicle pane is contacted with a conductor made of foil referred to as a "flat conductor". This foil conductor carries, in particular, a plurality of conductor tracks implemented as layers for contacting with the pane plug. Expediently, this foil conductor is folded at least once meanderingly between the vehicle pane and the pane plug at least such that, like a "slack rope", a "slack length" is formed for compensating relative movements between the pane plug and the vehicle pane. The foil conductor is, in turn, preferably guided by means of a "zero-insert-force-connector" onto the pane plug. Alternatively, the connection contacts of the pane plug are fixedly connected to the conductor tracks of the foil conductor, in particular, soldered. The foil conductor is, for example, inseparably connected to the functional element (e.g., soldered or conductively glued). Alternatively, the foil conductor or a different type of connection cable is fixed on the pane side in a contact holder floatingly connected to the pane adapter. This contact holder preferably has flexible spring contacts that are pressed on the functional element by the contact holder, in particular on its electrically conductive components. The floating connection of the contact holder to the pane adapter is advantageously designed such that a contact force is applied between the contact springs and the functional element, but that, at the same time, the contact holder is almost completely decoupled, at least transversely to this contact force, by movements between the pane adapter and the vehicle pane or the foil conductor (or the connection cable).

In another expedient embodiment, the pane adapter and/or the pane holder has at least one guide web with one or a plurality of abutting inclines for centering the pane adapter relative to the pane holder during assembly. Preferably, the pane adapter has, in particular, two guide webs with, in each case, an abutting incline, between which the pane holder is inserted during assembly to limit play transverse to the assembly direction. The pane holder has lead-in inclines complementary to the abutting inclines of the two guide webs. Furthermore, the coupling shoe preferably also has lead-in inclines for centering the mating plug during assembly. By means of the abutting inclines or the lead-in inclines as well as the guide webs, manufacturing-related tolerances in the kinematic coupling of the pane holder with the plug holder or the pane adapter with the coupling shoe are advantageously compensated and, thus, blind assembly is further facilitated.

In principle, in the context of the invention, the vehicle pane can be a windshield or a rear window of the vehicle. However, preferably, the window pane is an adjustable side window pane. In this case, in a preferred embodiment, the pane holder is constructed and provided for the movable (in particular, displaceable) coupling of the vehicle pane with the vehicle body, in particular with a window lifter mechanism of the vehicle. The pane holder is preferably a guide element (also referred to as a "pane carrier"), which, in the intended assembled state, forms part of the window lifter mechanism. The pane holder serves in this case, in particular, for guiding the vehicle pane between a closed position and an open position.

Figure 2:
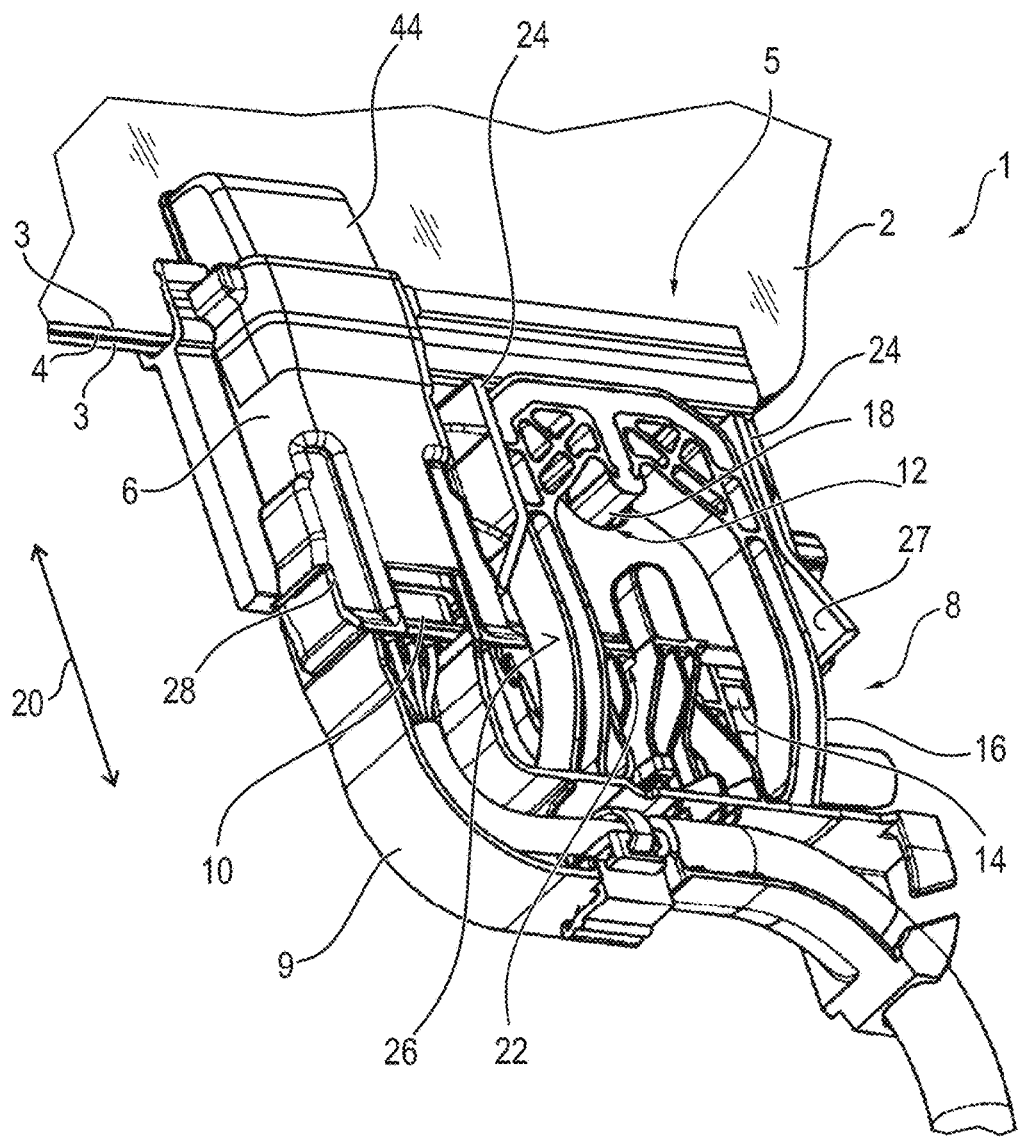
Figure 3:
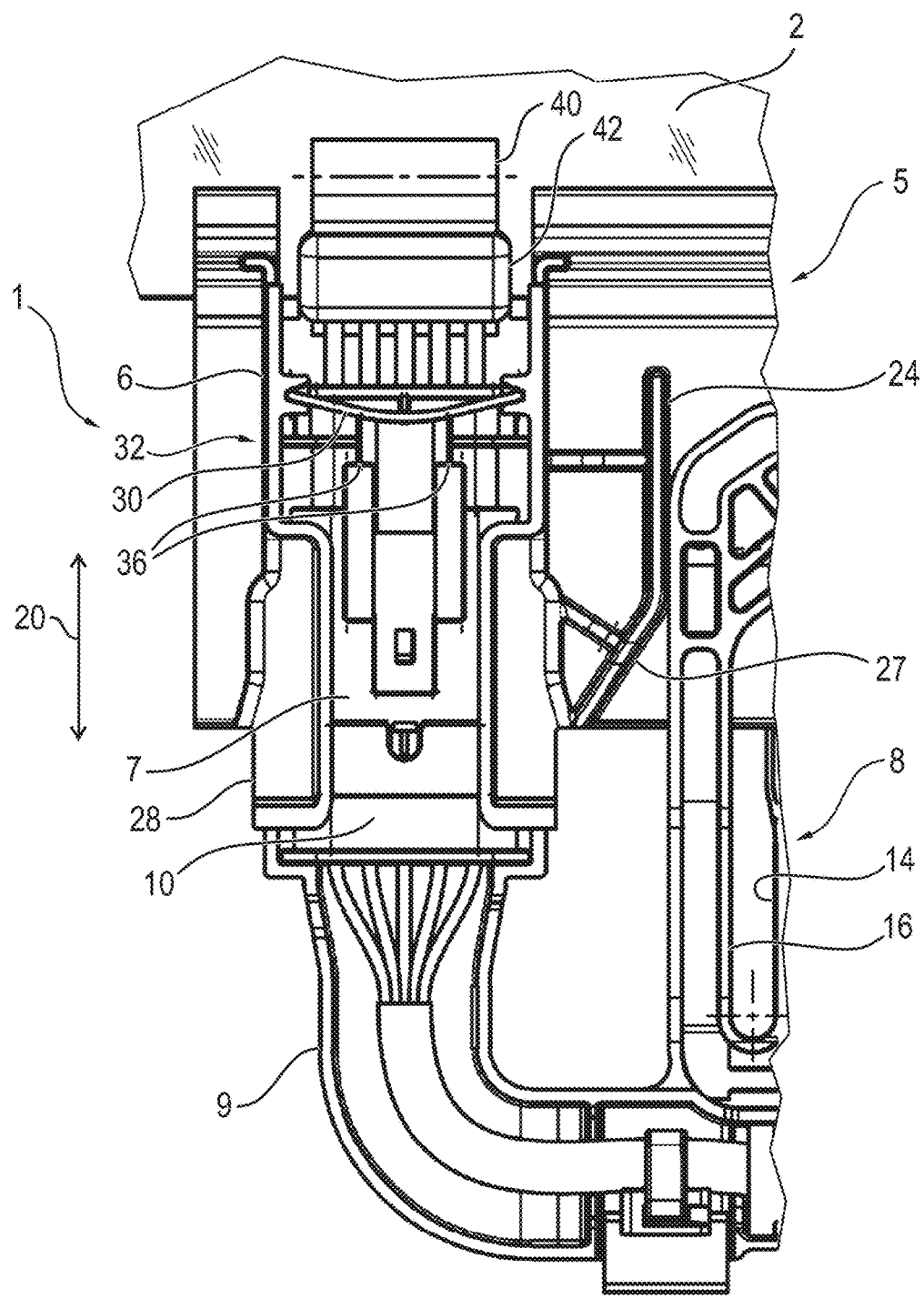
Figure 4:
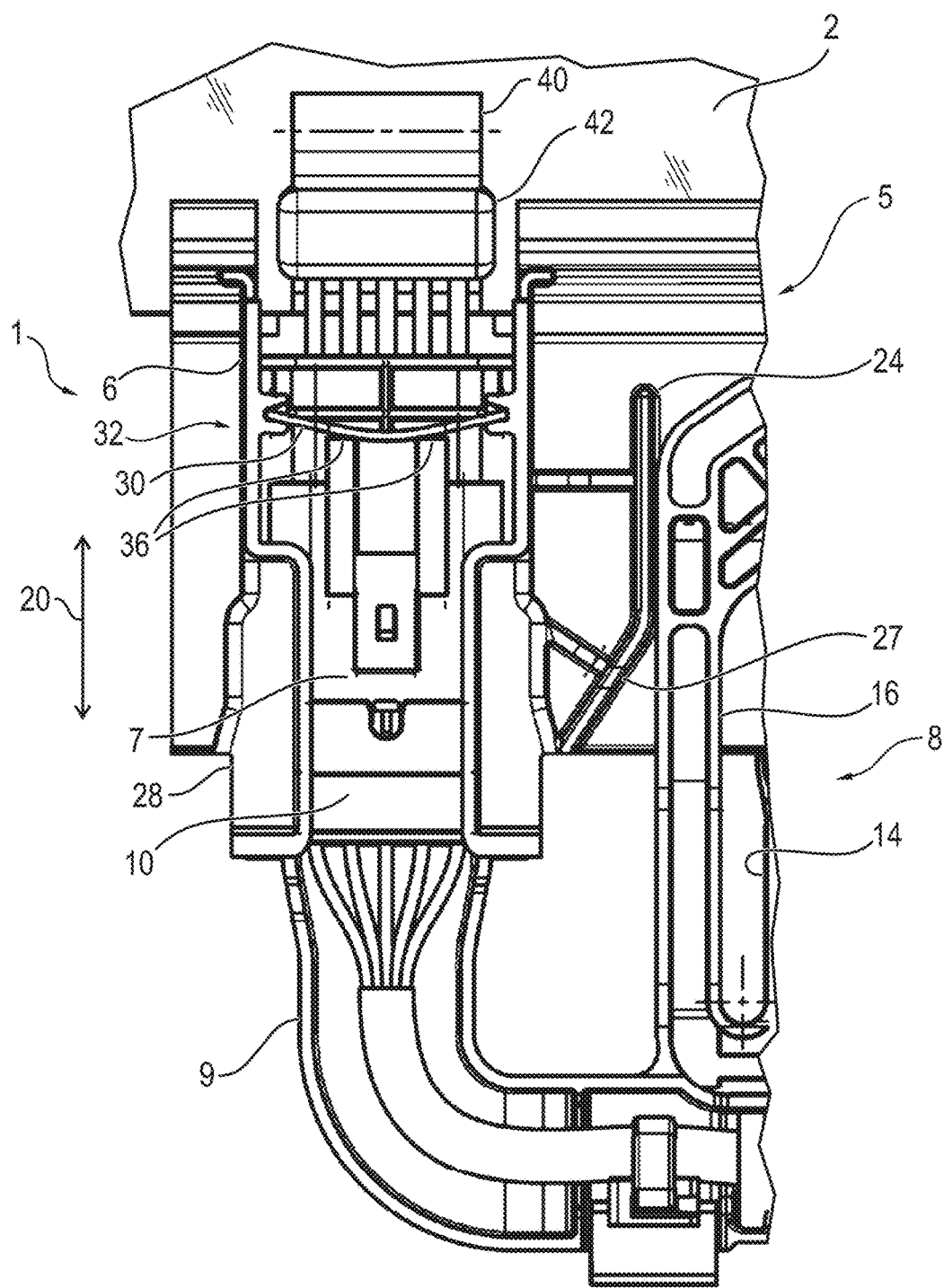
Figure 5:
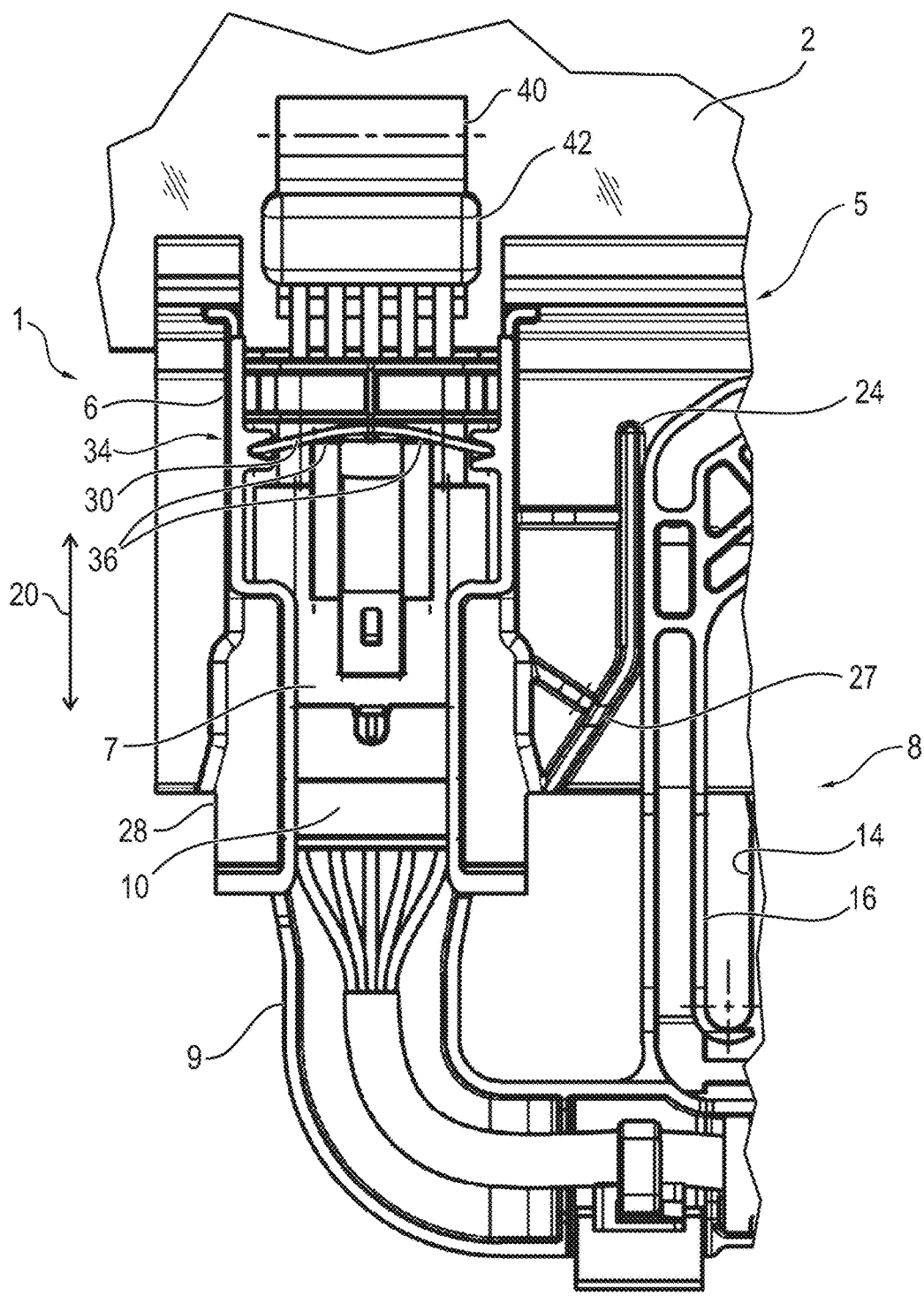
Figure 6:
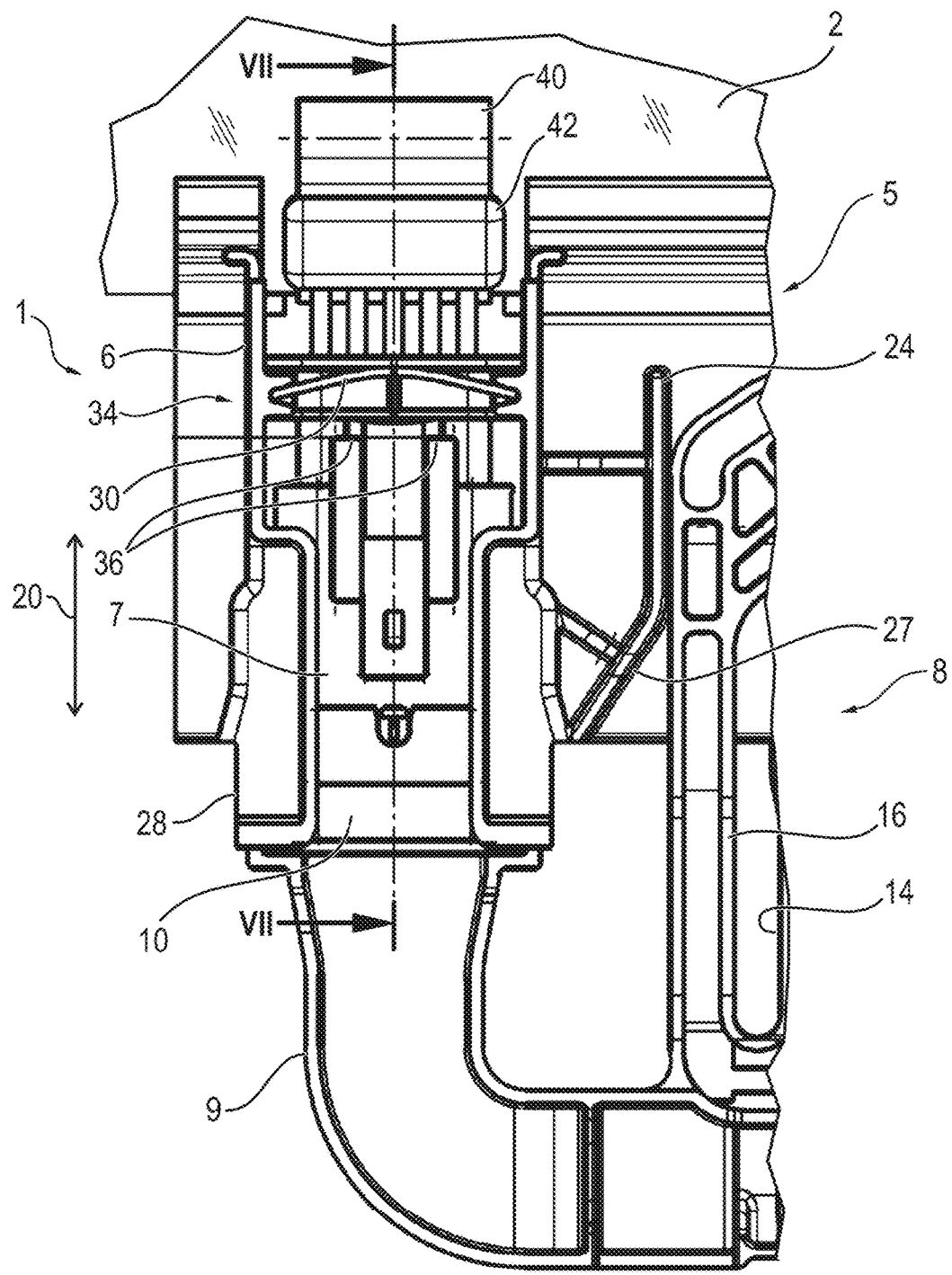
Figure 7:
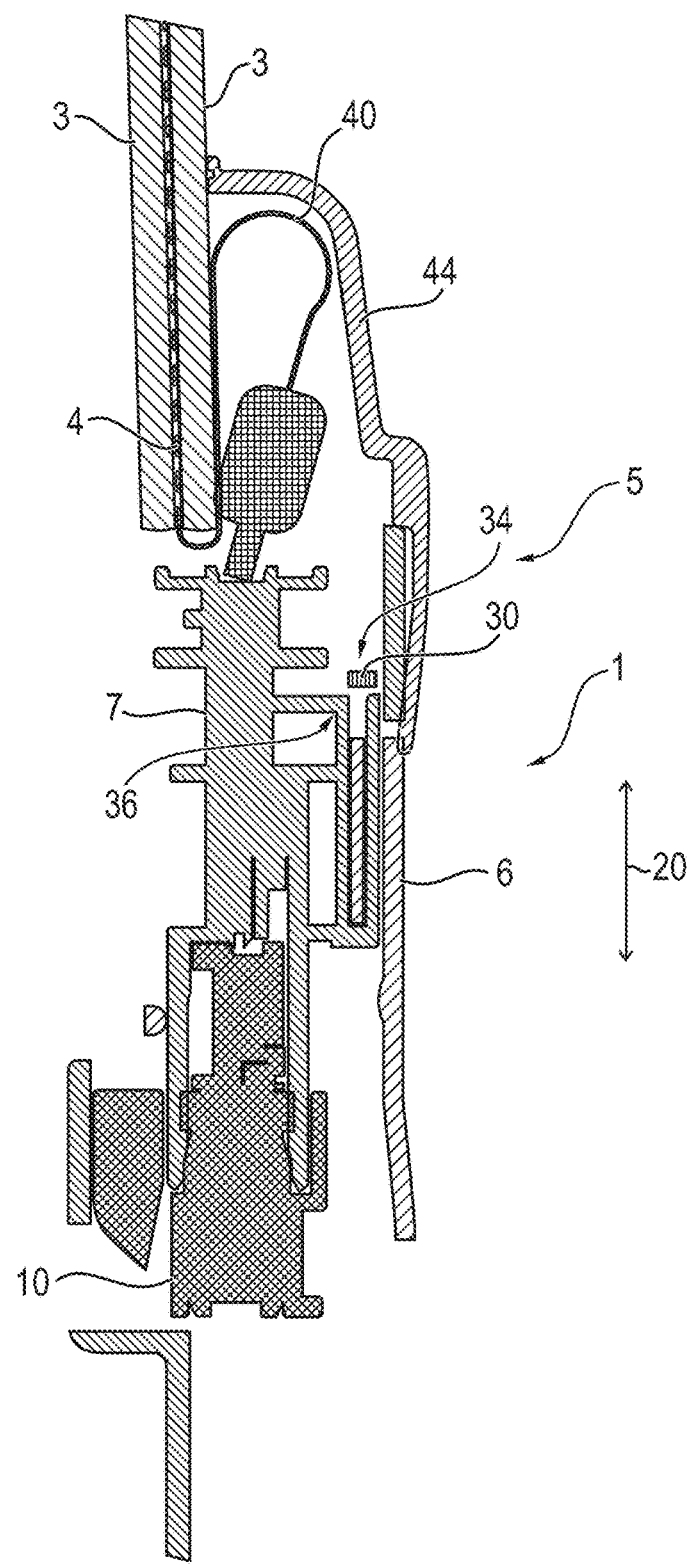
Figure 8:
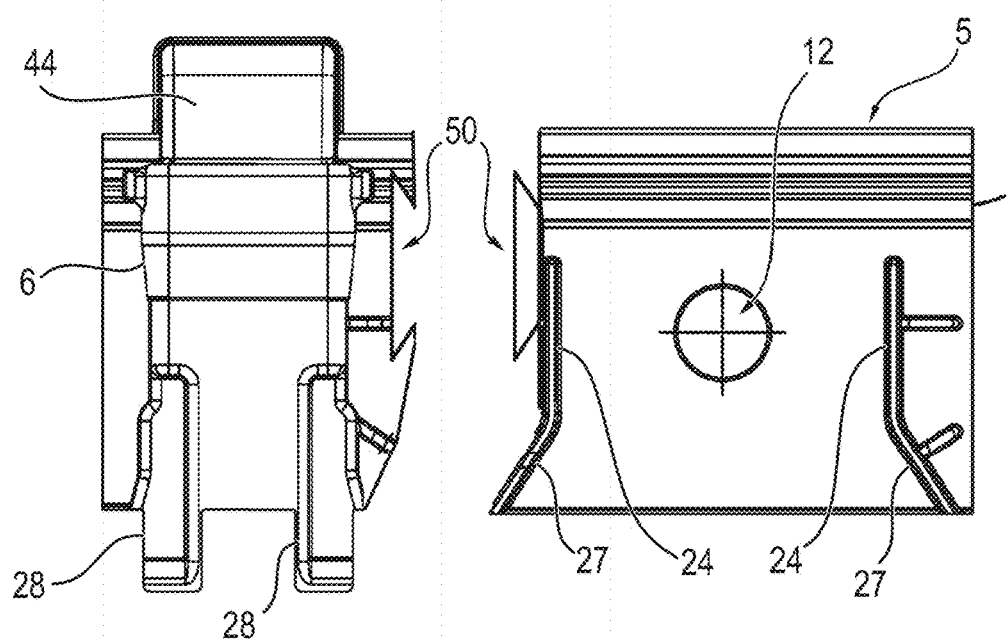
Figure 9:
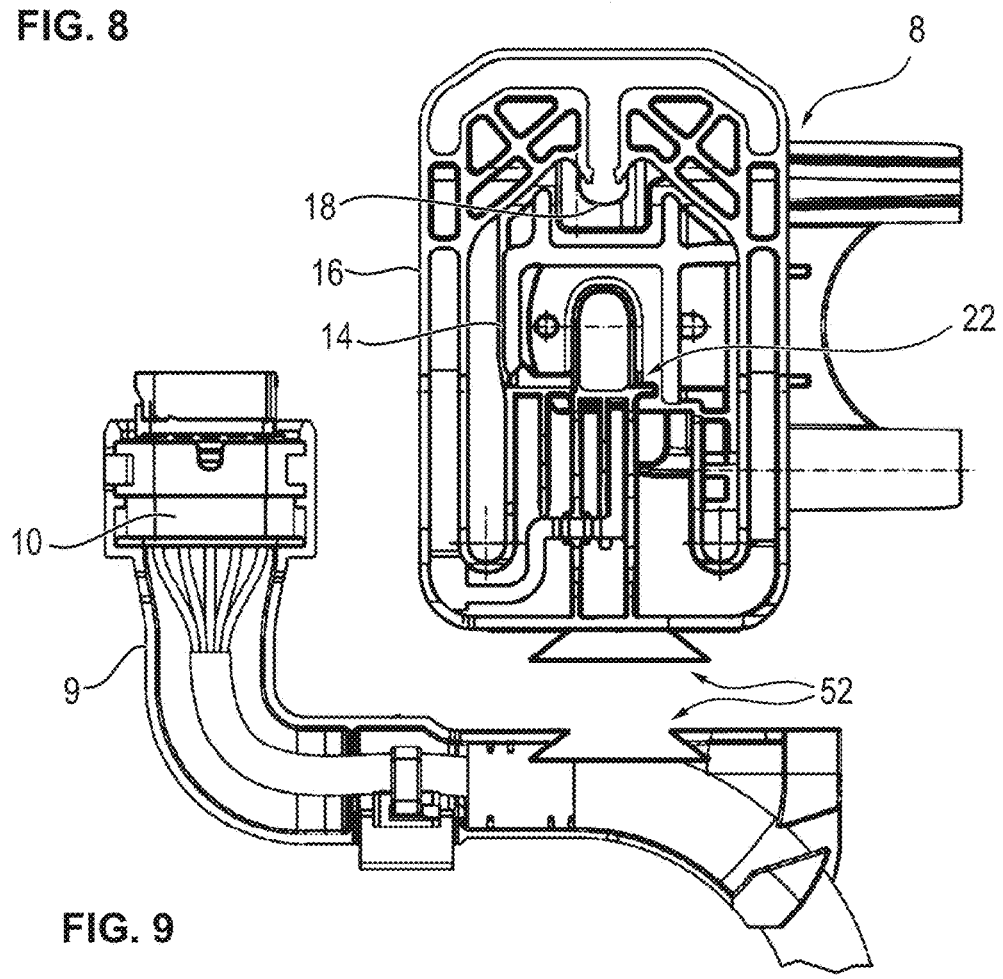

In the following, exemplary embodiments of the invention are explained in detail with reference to drawings. They depict:

FIG. 1 in a schematic perspective view, a device for fastening and electrical contacting a vehicle window pane in an unassembled state, FIG. 2 in a view according to FIG. 1, the device in an intended assembled state, FIG. 3 in a schematic plan view in a partially broken view, the device in a first assembly step, FIG. 4 in a view according to FIG. 3, the device in a second assembly step, FIG. 5 in a view according to FIG. 3, the device in a third assembly step, FIG. 6 in a view according to FIG. 3, the device in the intended assembled state, FIG. 7 in a sectional view VII-VII according to FIG. 6, the device, FIG. 8 and FIG. 9 in a schematic plan view, in each case, two components of the device according to an alternative exemplary embodiment.

Corresponding parts are always provided in all figures with the same reference characters.

FIG. 1 depicts a device for fastening (referred to in the following as "fastening device 1") of an only partially depicted vehicle window pane (referred to for short in the following as "vehicle pane 2"). Specifically, the vehicle pane 2 is a side pane of a vehicle that is constructed to be mounted in a (side) door of the vehicle displaceable by means of an (electric) window lifter. A functional element 4 (in the present exemplary embodiment, an electrochromic layer for variable darkening of the vehicle pane 2) is integrated in the vehicle pane 2, sandwich-like between two pane elements 3. The fastening device 1 serves in this case both for mechanically coupling the vehicle pane 2 in the door of the vehicle and for electrical contacting of the functional element 4 with a control unit associated therewith. For this, the fastening element 1 includes two assemblies, of which one assembly is associated with the vehicle pane 2 and the other assembly is associated with the vehicle body, specifically the window lifter.

The pane-side assembly includes an element referred to as "pane adapter 5", which, in the partially assembled state depicted in FIG. 1, is fixedly connected to the vehicle pane 2 (specifically, by a glued bond). In addition, the pane-side assembly includes a guide housing referred to as "coupling shoe 6" for a pane plug 7 (likewise associated with the pane-side assembly). The window-lifter-side assembly includes a holding element referred to as "pane carrier 8" (or also as "pane holder") which serves for holding the vehicle pane 2 and for transferring force from the window lifter to the vehicle pane 2. Furthermore, the window-lifter-side assembly includes a plug holder 9 as well as a plug arranged in the plug holder 9 and referred to as "mating plug 10". In the present exemplary embodiment, the plug holder 9 is manufactured in one piece with the pane carrier 8 as an injection molded component made of plastic. Likewise, the pane adapter 5 is implemented in one piece with the coupling shoe 6 and as a plastic component using injection molding technology.

For the mechanical coupling between the pane adapter 5 and the pane holder 8, the pane adapter 5 has an opening referred to as "latching hole 12". The pane carrier 8 has, for the mechanical coupling, a bottom part 14 and a top part 16, which are positioned clawlike opposite one another and which, in the intended assembled state according to FIG. 2, surround the pane adapter 5 on its upper and lower side. A latching projection 18, which, in the intended assembled state according to FIG. 2, engages in the latching hole 12 of the pane adapter 5, is implemented on the top part 16. For assembly, the vehicle pane 2 is inserted with the pane adapter 5 along an assembly direction 20 between the bottom part 14 and the top part 16 of the pane carriers 8. The latching projection 18 serves for latching the pane carrier 8 on the pane adapter 5 against separation. To limit the insertion path of the pane adapter 5 into the pane carrier 8, a stop shoulder 22 is implemented on the pane carrier 8.

In order, during assembly of the vehicle pane 2, to align the pane carrier 8 with the pane adapter 5, specifically the latching projection 18 with the latching hole 12, two guide webs 24 are arranged on the pane adapter 5, which cooperate during assembly with guide surfaces 26 formed laterally on the top part 16 for guiding the pane carrier 8 in assembly direction 20. To simplify assembly, the intermediate space between the guide webs 24 is expanded funnel-like by abutting inclines 27 arranged on the ends of the guide webs 24 facing the pane carrier 8. The top part 16 has, on its free end, correspondingly implemented lead-in inclines such that during insertion of the pane adapter 5 into the pane carrier 8 a slight misalignment transverse to the assembly direction 20 can be compensated.

As a result of the one-piece design of the plug holder 9 with the pane carrier 8 or of the coupling shoe 6 with the pane adapter 5, automatic contacting of the functional element 4 with the control unit associated therewith is enabled during assembly of the vehicle pane 2. Specifically, during assembly of the vehicle pane 2, the mating plug 10 and the pane plug 7 are automatically coupled with one another (i.e., without further action of an assembler) and the electrical contacting is implemented. For further simplification of assembly, two guide webs 28 with lead-in inclines are also implemented on the coupling shoe 6—as can be seen in FIG. 1 and FIG. 2.

To minimize an effect of relative movements between the vehicle pane 2 and the pane carrier 8 parallel to the assembly direction 20 on the connection contacts of the pane plug 7 and of the mating plug 10, specifically to suppress wear, in the intended assembled state according to FIG. 2, the pane plug 7 is mounted in the coupling shoe 6 movable along the assembly direction 20, i.e., with play. Thus, the mating plug 10, coupled, in the intended assembled state, with the pane plug 7, is also mounted movable relative to the coupling shoe 6. In order to nevertheless enable captive coupling of the pane plug 7 with the mating plug 10 during assembly of the vehicle pane 2, an elastic stop element in the form of a bistable spring 30 is arranged in the coupling shoe 6 (cf. FIG. 3). The bistabile spring 30 has in its first (stable) spring state a position referred to as "stop position 32", in which the hoop-like arched spring 30 is arched forward along the assembly direction 20 in the direction of the pane plug 7 (cf. FIG. 3). In its second spring state, the spring 30 assumes a spring position referred to as "release position 34", in which it is arched in the direction of the vehicle pane 2 (cf. FIG. 5).

Now, during the assembly of the vehicle pane 2, in a first assembly step (cf. FIG. 3), the pane adapter 5 is inserted between the bottom part 14 and the top part 16 of the pane carrier 8 and centered, in the process, by means of the guide webs 24. The plug holder 9 with the mating plug 10 arranged thereon is also centered relative to the coupling shoe 6 by means of the guide webs 28 thereon and the pane plug 7 comes into contact with the mating plug 10. During further insertion of the vehicle pane 2 or the pane adapter 5 into the pane carrier 8, the pane plug 7 is inserted—movably guided in the coupling shoe 6—by the mating plug 10 farther along the assembly direction 20 into the coupling shoe 6, until the pane plug 7 with shoulders 36 (arranged on the back) runs against the spring 30 (i.e., strikes it). Resistance is applied on the pane plug 7 by the spring 30 (upon further insertion of the vehicle pane 2), resulting in the fact that the pane plug 7 is latched to the mating plug 10 by means of latching elements (not shown in detail). The force required for latching the pane plug 7 to the mating plug 10 to be applied against the spring 30 is also referred to as "coupling force". The coupling force is less than a force required to suddenly change the spring 30 from the stop position 32 to the release position 34.

The stop position 32 of the spring 30 is selected such that the latching projection 18 of the pane carrier 8 cannot yet lock into the latching hole 12 of the pane adapter 5. Thus, it is advantageously accomplished that, during assembly of the vehicle pane 2, the coupling of the pane plug 7 with the mating plug 10 and, hence, the electrical contacting of the functional element 4 with the associated control unit occurs first, before the vehicle pane 2 is fixed as intended in the pane carrier 8. It is thus ensured that at the time the vehicle pane 2 is latched as intended, electrical contacting of the functional element 4 has already occurred.

For the intended assembly of the vehicle pane 2, it is thus pushed, after the coupling of the pane plug 7 with the mating plug 10, farther in the direction of the pane carrier 8 such that the shoulders 36 of the pane plug 7 are pressed farther against the spring 30 until the force necessary for suddenly changing the spring 30 is exceeded. The spring 30 suddenly changes from its stop position 32 into the release position 34, and the pane plug 7 as well as the pane carrier 8 move farther along the assembly direction 20, with latching of the latching projection 18 with the latching hole 12 then occurring (cf. FIG. 5 and FIG. 2).

As is discernible from FIG. 6, in the intended assembled state of the vehicle pane 2, by means of the sudden changing of the spring 30 to the release position 34, there is play between the shoulders 36 and the spring 30 along the assembly direction 20 such that relative movements between the vehicle pane 2 and the pane carrier 8 remain without effect on the connection between the pane plug 7 and the mating plug 10.

During the assembly of the vehicle pane 2, a force-displacement curve is produced which initially hardly rises until the pane plug 7 rests against the spring 30. Then, the force to be applied for further assembly increases, until the pane plug 7 initially engages with the mating plug 10. Thereupon, the force increases further until subsequently (upon reaching the assembly force) the spring 30 suddenly changes, whereupon the pane adapter 5 also engages with the pane carrier 8. When the spring 30 suddenly changes, it moreover emits, like a clicking frog, an acoustic feedback, specifically a clicking sound, with signals the intended assembly of the vehicle pane 2 to an assembler.

In order to be able to mount the pane plug 7 movably relative to the vehicle pane 2, the pane plug 7 is movably contacted with the functional element 4. For this, the functional element 4 is contacted with a foil conductor 40, which is routed out of the vehicle pane 2 between the pane elements 3. In order to enable movement of the pane plug 7, the foil conductor 40 is meanderingly folded such that a "slack length" (like a slack rope) is retained. By means of an adapter piece 42, which specifically forms a "zero-insert-force-connector", the foil conductor 40 is electrically connected to the connection contacts arranged in the pane plug 7. In order to protect the foil conductor 40 against mechanical influences as well as environmental influences, specifically, moisture, a cap 44, in extension of the coupling shoe 6, is connected to the pane-side assembly, specifically to the coupling shoe 6. This cap 44 covers the foil conductor 40 sealingly with the vehicle pane 2.

FIG. 8 and FIG. 9 depict an alternative exemplary embodiment of the fastening device 1, specifically, the pane-side assembly as well as the window-lifter-side assembly. In both cases, the component of the respective assembly associated with the electrical connection is implemented separately from the component mentioned for the mechanical connection. In other words, the pane adapter 5 is implemented separately from the coupling shoe 6 (as well as the cap 44 arranged thereon). However, the pane adapter 5 and the coupling shoe 6 have mutually complementary connecting elements 50 (indicated schematically), by means of which they can be connected to one another (cf. FIG. 8). As is discernible from FIG. 9, the window-lifter-side assembly is implemented accordingly. In other words, the pane carrier 8 is implemented separately from the plug holder 9, and both have, in each case, mutually complementary connecting elements 52 (indicated schematically) for the optional coupling of the plug holder 9 with the pane carrier 8.

The subject matter of the invention is not limited to the aforedescribed exemplary embodiments. On the contrary, the person skilled in the art can derive other embodiments of the invention from the above description. In particular, the individual features of the invention and their variant embodiments described with reference to the various exemplary embodiments can also be combined with one another differently.

LIST OF REFERENCE CHARACTERS 1 fastening device
2 vehicle pane
3 pane element
4 functional element
5 pane adapter
6 coupling shoe
7 pane plug
8 pane carrier
9 plug holder
10 mating plug
12 latching hole
14 bottom part
16 top part
18 latching projection
20 assembly direction
22 stop shoulder
24 guide web
26 guide surface
27 abutting incline
28 guide web
30 spring
32 stop position
34 release position
36 shoulder
40 foil conductor
42 adapter piece
44 cap
50 connecting element
52 connecting element

The invention claimed is:
1. A device for fastening and electrical contacting of a vehicle window pane in which at least one electrical functional element is integrated, the device comprising:
a pane adapter that is configured to be fixed on the vehicle window pane, the pane adapter comprising a latching hole;
a pane holder that is configured to couple the pane adapter with a vehicle body, the pane holder comprising a latching projection;
a pane-side plug that, in an intended assembled state, is configured to establish electrical contact with the at least one electrical functional element of the vehicle window pane;
a pane-side coupling shoe configured to mount the pane-side plug on the vehicle window pane; and a mating plug that is configured to couple with the pane-side plug to provide an electrical contact of the functional element with a control unit, wherein the pane adapter, the pane-side coupling shoe, the pane holder, and a plug holder that supports the mating plug, are kinematically coupled so that during assembly of the vehicle window pane using the pane adapter on the pane holder, the pane-side plug is connected to the mating plug, wherein latching between the pane adapter and the pane holder in the intended assembled state is provided by engaging of the latching projection in the latching hole, and wherein the pane-side plug, in the intended assembled state, allows a relative movement between the vehicle window pane and the pane-side plug.

2. The device according to claim 1,
wherein the pane adapter is integrally connected to the pane-side coupling shoe, and the pane holder is integrally connected to the plug holder.

3. The device according to claim 1,
wherein at least one of the pane adapter and the pane holder has at least one guide web comprising at least one abutting incline, the at least one guide web configured to center the latching hole of the pane adapter relative to the latching projection of the pane holder during assembly.

4. The device according to claim 1,
wherein the pane holder is constructed for movable coupling of the vehicle window pane with the vehicle body.

5. The device according to claim 1,
wherein the pane holder comprises a bottom part and a top part that are positioned clawlike opposite one another, so to surround a lower side and an upper side of the pane adapter, and
wherein the latching projection is implemented on the top part of the pane holder.

6. The device according to claim 5,
wherein the pane adapter and the pane holder are designed so that upon achieving the required assembly force, latching between the pane adapter and the pane holder is provided.

7. The device according to claim 1,
wherein, on at least one of the pane side coupling shoe and the plug holder, an elastic stop element is arranged that is configured, during assembly, to apply a coupling force for coupling of the pane side plug with the mating plug.

8. The device according to claim 7,
wherein the elastic stop element is constructed to emit at least one of an acoustic and a haptic feedback for signaling the intended assembled state of the vehicle window pane on the vehicle body.

9. The device according to claim 7,
wherein the elastic stop element is implemented so that, in the intended assembled state of the vehicle window pane on the vehicle body, no force is exerted on a mounting with play of the pane-side plug and the mating plug along an assembly direction of the vehicle window pane.

10. The device according to claim 7,
wherein the elastic stop element is a spring.

11. The device according to claim 10,
wherein the spring is a bistable spring having two stable states.

12. A device for fastening and electrical contacting of a vehicle window pane in which at least one electrical functional element is integrated, the device comprising:
a pane adapter that is configured to be fixed on the vehicle window pane, the pane adapter comprising a latching hole;
a pane holder that is configured to couple the pane adapter with a vehicle body, the pane holder comprising a latching projection;
a pane-side plug that, in an intended assembled state, is configured to establish electrical contact with the at least one electrical functional element of the vehicle window pane;
a pane-side coupling shoe configured to mount the pane-side plug on the vehicle window pane; and
a mating plug that is configured to couple with the pane-side plug to provide an electrical contact of the functional element with a control unit,
wherein the pane adapter, the pane-side coupling shoe, the pane holder, and a plug holder that supports the mating plug, are kinematically coupled so that during assembly of the vehicle window pane using the pane adapter on the pane holder, the pane-side plug is connected to the mating plug,
wherein latching between the pane adapter and the pane holder in the intended assembled state is provided by engaging of the latching projection in the latching hole,
wherein, on at least one of the pane side coupling shoe and the plug holder, an elastic stop element is arranged that is configured, during assembly, to apply a coupling force for coupling of the pane side plug with the mating plug, and
wherein the elastic stop element is constructed to emit at least one of an acoustic and a haptic feedback for signaling the intended assembled state of the vehicle window pane on the vehicle body.

13. A device for fastening and electrical contacting of a vehicle window pane in which at least one electrical functional element is integrated, the device comprising:
a pane adapter that is configured to be fixed on the vehicle window pane, the pane adapter comprising a latching hole;
a pane holder that is configured to couple the pane adapter with a vehicle body, the pane holder comprising a latching projection;
a pane-side plug that, in an intended assembled state, is configured to establish electrical contact with the at least one electrical functional element of the vehicle window pane;
a pane-side coupling shoe configured to mount the pane-side plug on the vehicle window pane; and
a mating plug that is configured to couple with the pane-side plug to provide an electrical contact of the functional element with a control unit,
wherein the pane adapter, the pane-side coupling shoe, the pane holder, and a plug holder that supports the mating plug, are kinematically coupled so that during assembly of the vehicle window pane using the pane adapter on the pane holder, the pane-side plug is connected to the mating plug,
wherein latching between the pane adapter and the pane holder in the intended assembled state is provided by engaging of the latching projection in the latching hole,
wherein, on at least one of the pane side coupling shoe and the plug holder, an elastic stop element is arranged that is configured, during assembly, to apply a coupling force for coupling of the pane side plug with the mating plug, and wherein the elastic stop element is a bistable spring having two stable states.

* * * * *